Patented Dec. 26, 1944

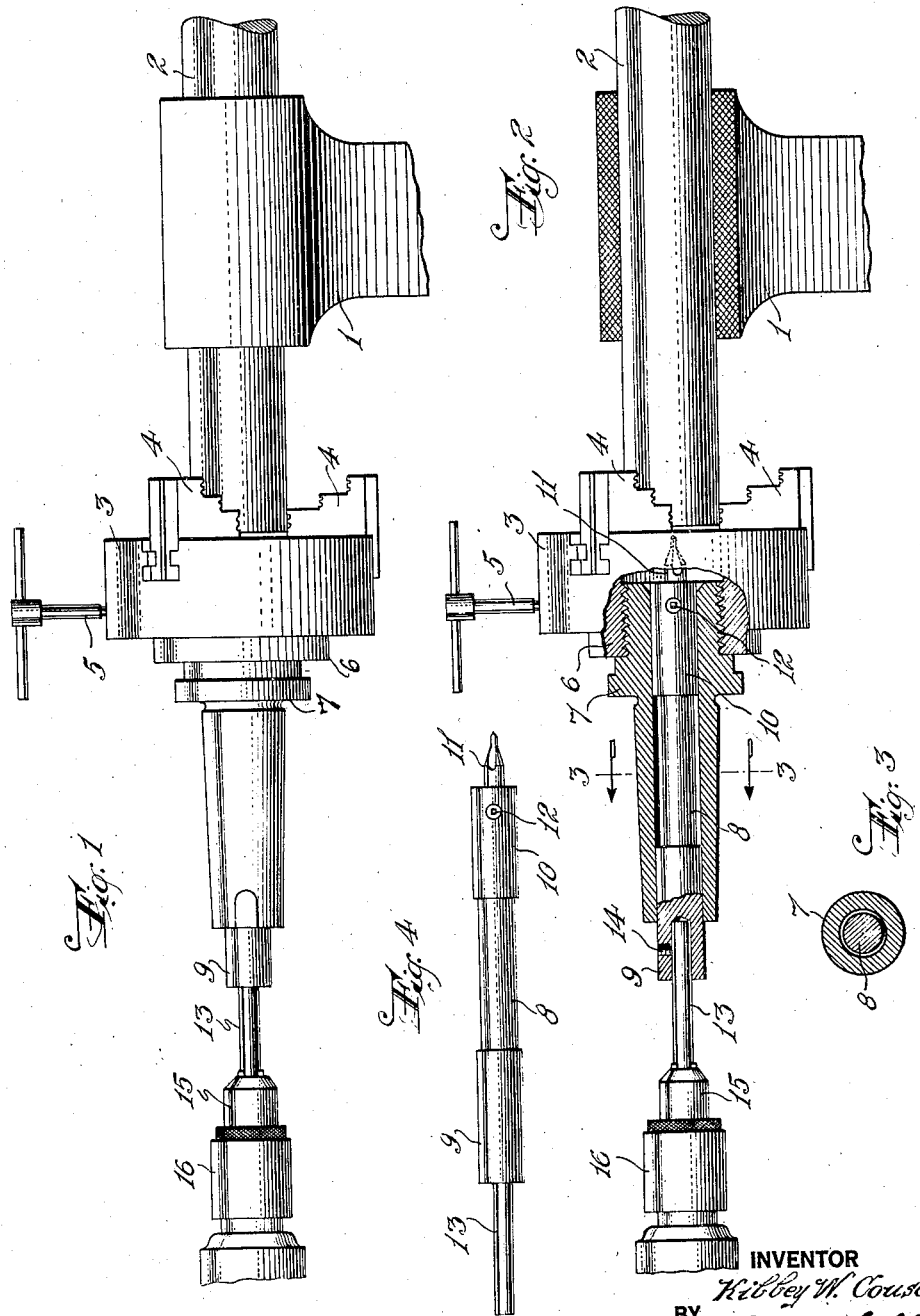

2,365,939

UNITED STATES PATENT OFFICE 2,365,939

CENTER-DRILLING DEVICE

Kibbey W. Couse, Newark, N. J.

Application November 24, 1943, Serial No. 511,545

3 Claims. (Cl. 77—18)

This invention relates to means for center-drilling a piece of material such, for example, as a piece of shafting so that it may be mounted between the head and tail stocks in a lathe in such a manner that its axis is in as nearly perfect alignment with the axial line of the centers of the head and tail stocks as possible. It frequently happens that a piece of material such as a shaft which has to be turned down is under-size, whereby unless it is accurately centered in the lathe there will be some places on its arcuate surface that will not have material enough to come within the turning area; or, stated in another way, if the piece is turned so as to take at least even a fine cut along a certain portion, the piece will be under the diameter required. Hence it is very necessary to see that the piece is accurately spotted or centered before it is put into the lathe for the turning operation. As far as I am aware, it has been the practice in the past for a mechanic to spot the centers with a hammer and prick punch in a well-known manner, with the results as indicated above.

It is therefore the principal object of my invention to provide means for center-drilling as accurately as possible the piece that is to be turned down in a lathe.

My improved structure is illustrated in the attached drawing wherein:

Figure 1 is a plan view of the setup or means for obtaining the necessary result.

Figure 2 is a view similar to Figure 1 but with certain of the parts in section.

Figure 3 is a view on the line 3—3 of Figure 2.

Figure 4 is a view of the center-drilling tool required in the operation.

In the different views wherein like numbers refer to corresponding parts, 1 is a support which may be a vise or some other suitable means for holding a shaft 2 which is to be centered. The opposite end of the shaft 2 is held in a chuck 3 preferably of the universal type; that is to say, one in which the jaws 4 of the chuck are simultaneously moved by the hand tool 5 into gripping position with the piece, such as the shaft 2, inserted into the chuck. The chuck 3 carries a threaded member 6 accurately positioned in the chuck 3 so that its center coincides with the axial center of the chuck. Into this threaded member 6, is threaded one end of an elongated rigid guide bushing 7.

Carried by the bushing 7, is a drill holder 8 having ends 9 and 10 larger than the intermediate portion. These parts 9 and 10 are adapted to fit snugly within the hollow bushing 7 and act as bearings at opposite ends of the elongated guide bushing 7. The space between the bearing portions 9 and 10, of reduced diameter, provides a space within the bushing 7 which may be packed with a suitable lubricant to lubricate the bearings 9 and 10.

A drill 11 fits snugly in the part 10 of the holder 8 in any satisfactory manner as by a set screw 12. The drill 11 has a point formed to produce a sharply defined centering hole, usually referred to as a countersink, in the member such as 2 for subsequently positioning the member 2 in a turning lathe. The portion 9 of the holder 8 is adapted to receive a spindle 13 which is fastened thereto in any satisfactory manner as by a set screw 14. The spindle 13 is carried by a chuck 15 that is carried by a suitable operating device such as the shaft of spindle 16 of a hand or power drive.

Since the drill 11 is carried by the elongated holder 8 having spaced bearings 9 and 10 of considerable length, the point of the drill 11 is positioned at the axial center of the chuck 3 and a substantially true center can be obtained in the member 2.

What I claim is:

1. Means for centering a piece to be subsequently machined in a lathe, comprising, a chuck for attachment to one end of said piece, a member carried by the chuck so its center coincides with the axial center of the chuck, an elongated, hollow but rigid guide bushing fastened to said chuck member so their axial centers are coincident but extending nearly its full length away from the chuck which forms the entire support for said guide bushing, said bushing having internal smooth bearing surfaces at least at its opposite ends, a drill holder fitting within said bushing on said bearing surfaces, with means for making a driving and feeding connection thereto at its extreme end away from the chuck, and a sharp-pointed drill carried directly by the holder at its chuck end.

2. Means for centering a piece to be subsequently machined in a lathe, comprising, a chuck for attachment to one end of said piece, a member carried by the chuck so its center coincides with the axial center of the chuck, a tubular-shaped, elongated, rigid guide bushing fastened to and wholly supported by said chuck member so their axial centers are coincident, said bushing having a centrally located uniform bore throughout its length, a drill holder having at least at its ends relatively long bearing portions to snugly fit said bore at its opposite ends, one of said drill holder ends extending without the bushing, with means for making a driving and feeding attachment thereto, and a drill carried directly by the other drill holder bearing having a point formed to produce a sharply defined center in said piece.

3. For use in centering a piece carried by a chuck, an elongated, hollow, rigid bushing wholly supported by the chuck, a drill holder carried within the bushing and having bearings at its opposite ends, a drill connected directly to the chuck end bearing, while its other end bearing has a driving and feeding means connected thereto.

KIBBEY W. COUSE.